(12) United States Patent
Kato et al.

(10) Patent No.: US 7,503,786 B2
(45) Date of Patent: Mar. 17, 2009

(54) CONNECTING MEMBER AND CONNECTOR EACH HAVING A SLIDER ADAPTED TO DISPLACE CONTACT PORTIONS

(75) Inventors: Nobukazu Kato, Tokyo (JP); Masakazu Kuroiwa, Tokyo (JP); Rintaro Kato, Tokyo (JP); Kazushi Kamata, Aomori (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/810,912

(22) Filed: Jun. 7, 2007

(65) Prior Publication Data

US 2008/0009170 A1 Jan. 10, 2008

(30) Foreign Application Priority Data

Jul. 7, 2006 (JP) ............................. 2006-188700
Aug. 2, 2006 (JP) ............................. 2006-211326

(51) Int. Cl.
*H01R 33/08* (2006.01)
(52) U.S. Cl. ...................................... 439/239; 439/246
(58) Field of Classification Search ................. 439/232, 439/239, 246, 261, 263
See application file for complete search history.

(56) References Cited

U.S. PATENT DOCUMENTS

| 3,541,492 | A | * | 11/1970 | Fenn | ........................... 439/239 |
| 5,340,327 | A | * | 8/1994 | Koda | ........................... 439/239 |
| 5,886,758 | A | | 3/1999 | Ibaraki | |

FOREIGN PATENT DOCUMENTS

| JP | 10-289610 | 10/1998 |
| JP | 2001-110535 | 4/2001 |
| JP | 2002/2367422 | 12/2002 |
| JP | 2003/257570 | 9/2003 |
| JP | 2005-183011 | 7/2005 |
| JP | 2005-259370 | 9/2005 |
| JP | 2007-165208 | 6/2007 |
| JP | 2007-323924 | 12/2007 |
| JP | 2007-335178 | 12/2007 |

OTHER PUBLICATIONS

Japanese Office Action dated Jun. 25, 2008.

* cited by examiner

*Primary Examiner*—Khiem Nguyen
(74) *Attorney, Agent, or Firm*—Collard & Roe, P.C.

(57) ABSTRACT

A connecting member has a slider with rotation shafts and a contact combined with the slider. The contact has contact portions for connection to a connection object and pressing portions connected to the contact portions, respectively. By rotating the slider about the rotation shafts to press the pressing portions, the contact portions are displaced to be connected to the connection object. It may be configured to press the pressing portions by moving the slider in a straight or curved line. Further, it may be configured that the slider presses the pressing portions to thereby displace the contact portions in directions away from the connection object.

24 Claims, 20 Drawing Sheets

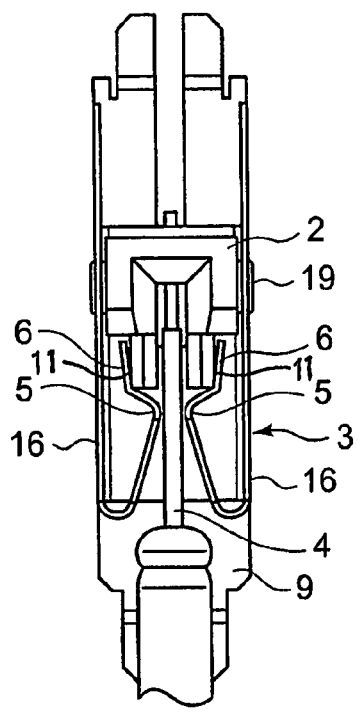
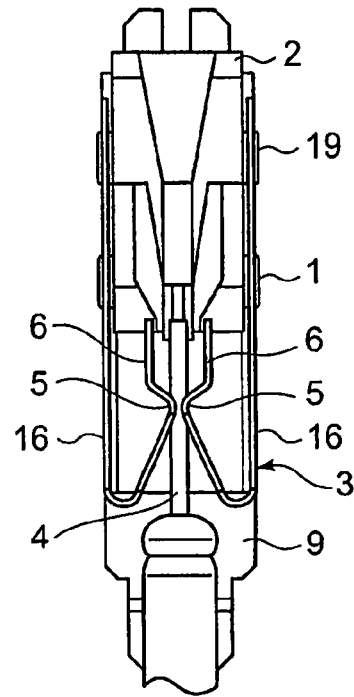
FIG. 20A          FIG. 20B
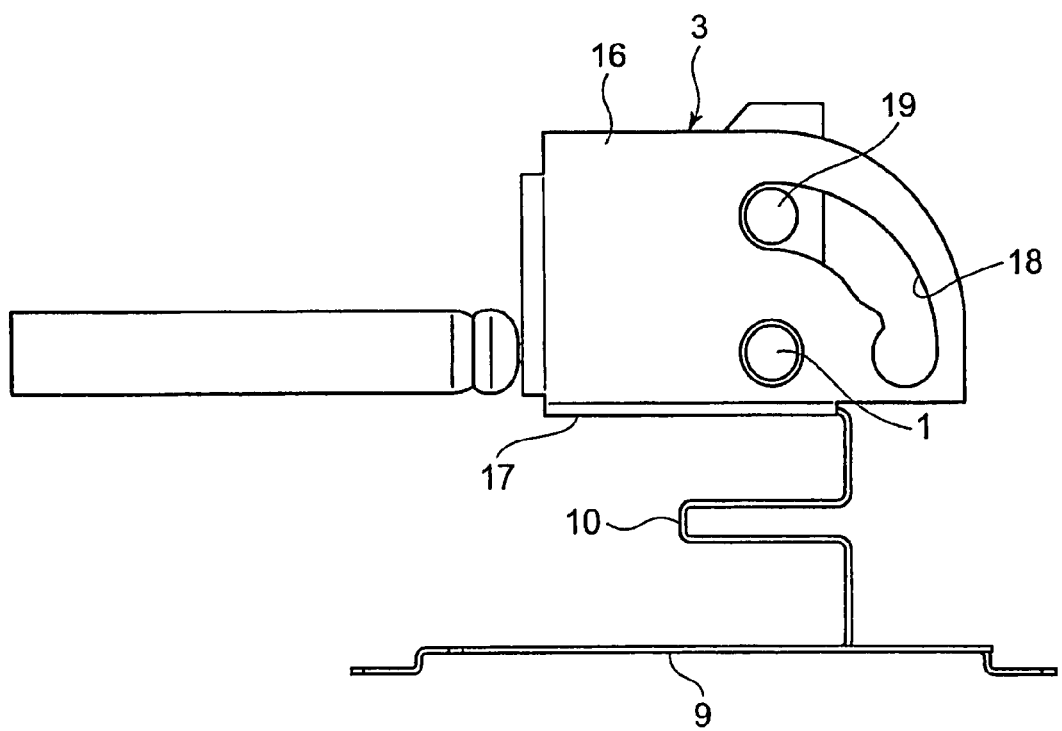
FIG. 21

US 7,503,786 B2

CONNECTING MEMBER AND CONNECTOR EACH HAVING A SLIDER ADAPTED TO DISPLACE CONTACT PORTIONS

This application claims priority to prior applications JP 2006-188700 and JP2006-211326, the disclosures of which are incorporated herein by reference.

BACKGROUND OF THE INVENTION

This invention relates to a connecting member and a connector, such as a direct-type lamp socket capable of connecting a lamp tube as a connection object.

Thin lamp tubes such as CCFLs or EEFLs have been used as light sources in backlight modules of large liquid crystal displays. The type that directly irradiates light of lamp tubes onto a liquid crystal panel from its back side is called a "direct type", which is excellent in light utilization efficiency and thus is optimal for a backlight of a liquid crystal display such as a monitor or a television that requires high brightness.

The conventional direct-type backlight modules have several types.

In one type, a plurality of lamp tubes are disposed at intervals on a metal housing, called a chassis, of a backlight module. Each lamp tube has at its both ends lead wires serving as electrode portions and one end of an electrical cable is soldered to each of the lead wires, i.e. the electrode portions. Each electrode portion is coated with a rubber member at its one end where the electrical cable is soldered. A terminal is press-fitted to the other end of each electrical cable drawn out from the rubber member and is received in a connector housing so as to be connected to a connector mounted on an inverter board disposed on the back side of the chassis. In this manner, the power is supplied to the lamp tubes through the connectors and the electrical cables.

In another type, connectors each comprising an insulator, a terminal portion, and a slider member are mounted on an inverter board. Each connector extends to a lamp tube mounting surface through a chassis to directly connect an electrode portion of a lamp tube at its terminal portion. In this type, by incorporating the lamp tube into the terminal portion of the connector and then operating the slider member, a lead wire of the lamp tube and a contact of the connector are connected together. After the connection, the lead wire is relatively firmly fixed.

SUMMARY OF THE INVENTION

However, the conventional direct-type backlight modules have the following drawbacks.

In the type that supplies the power to the lamp tubes through the electrical cables, since the lamp tubes are connected to the inverter board through the rubber members, the electrical cables, and the connectors, the number of components used is large and the number of working processes is also large. Further, when replacing each lamp tube, some associated components should also be replaced, which is thus costly. Further, the lamp tubes soldered with the electrical cables tend to be damaged during handling.

On the other hand, in the type that mounts the connectors on the inverter board and directly connects the lamp tubes, the number of components is reduced and each lamp tube can be easily attached and detached. However, there occur stresses such as a stress that occurs during contact due to a position offset between the lamp tube and the connector which is caused when assembling them, a stress of vibration or impact applied during conveyance or during use of a liquid crystal assembly, and a stress due to thermal contraction of the lamp tube caused by heat generation of the lamp tube itself. These stresses may be concentrated at the lead wires or lead wire sealing portions of the lamp tube to thereby damage the lamp tube or shorten the lifetime of the lamp tube.

Incidentally, a socket for connecting a general lamp is disclosed, for example, in Japanese Unexamined Patent Application Publication (JP-A) No. 2003-257570 and a socket for connecting a fluorescent lamp is disclosed, for example, in Japanese Unexamined Patent Application Publication (JP-A) No. 2002-367422. However, these sockets also cannot solve the foregoing problems.

It is therefore an object of this invention to provide a connecting member that improves handling of a connection object and facilitates attachment and detachment of the connection object.

It is another object of this invention to provide a connector that improves handling of a lamp tube and facilitates attachment and detachment of the lamp tube.

Other objects of the present invention will become clear as the description proceeds.

According to an aspect of the present invention, there is provided a connecting member for connecting a connection object. The connecting member comprises a contact which has a contact portion for contact with the connection object and has a pressing portion near the contact portion and a slider which is movable with respect to the contact, wherein the slider operates the pressing portion depending on movement of the slider to thereby displace the contact portion.

According to another aspect of the present invention, there is provided a connector for connecting a lamp tube having a lead wire. The connector comprises a contact which has a contact portion for contact with the lead wire and has a pressing portion near the contact portion and a slider which is movable with respect to the contact, wherein the slider operates the pressing portion depending on movement of the slider to thereby displace the contact portion.

According to still another aspect of the present invention, there is provided a connector for connecting a lamp tube having a lead wire. The connector comprises a contact which comprises a contact portion for contact with the lead wire, a board connecting portion for connection to a board, and a flexible link portion interposed between the board connecting portion and the contact portion, wherein the contact portion has floatability with respect to the board connecting portion through the link portion.

BRIEF DESCRIPTION OF THE DRAWINGS

FIG. 20A is a plan view showing the connector shown in FIGS. 19A and 19B along with the lamp tube in the state before the lamp tube is connected to the connector;

FIG. 20B is a plan view showing the connector shown in FIGS. 19A and 19B along with the lamp tube in the state where the lamp tube is connected to the connector;

FIG. 21 is a side view of the connector shown in FIGS. 19A and 19B;

DESCRIPTION OF THE PREFERRED EMBODIMENTS

Figure 1:
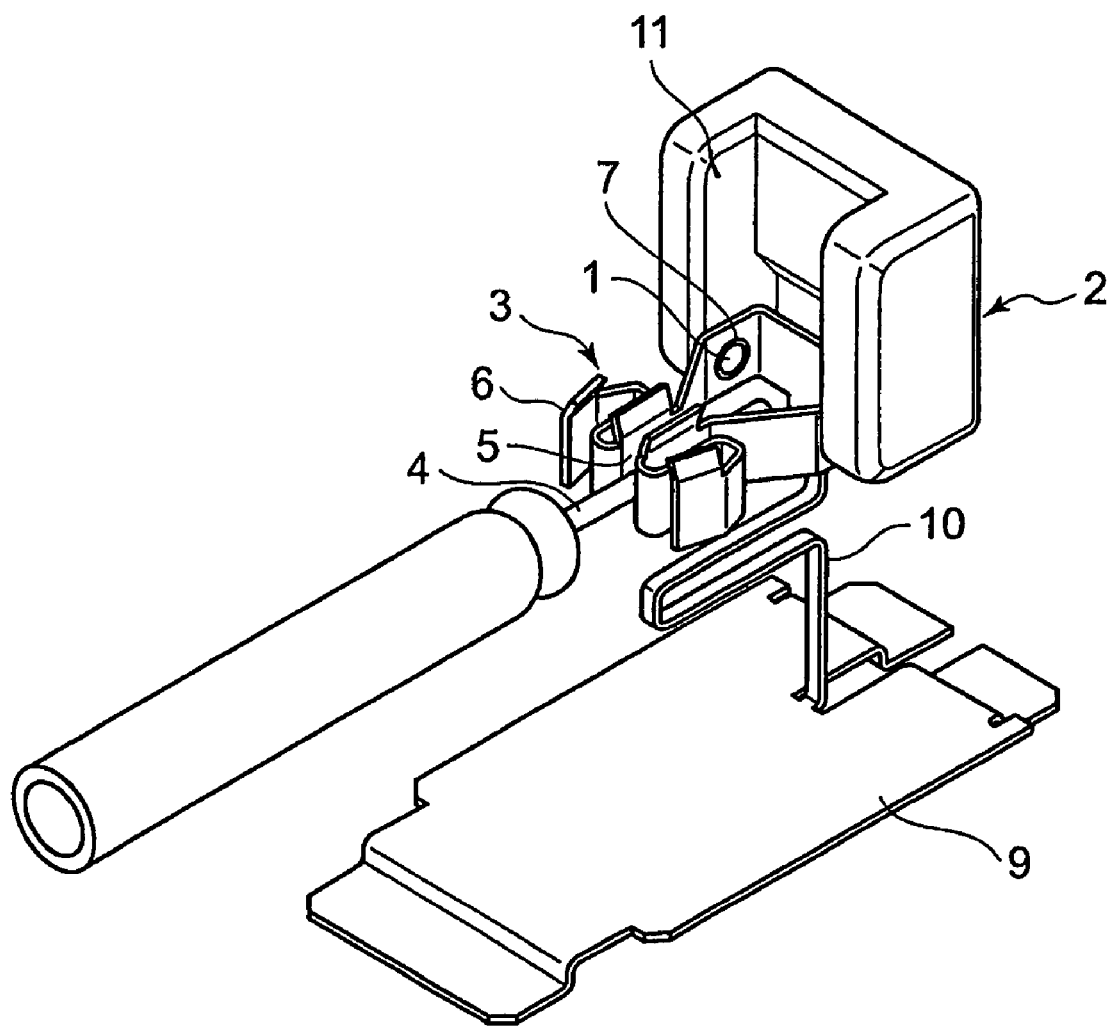
FIG. 1 is a perspective view showing a connector according to a first embodiment of this invention along with a lamp tube in the state before the lamp tube is connected to the connector.
Figure 2A:
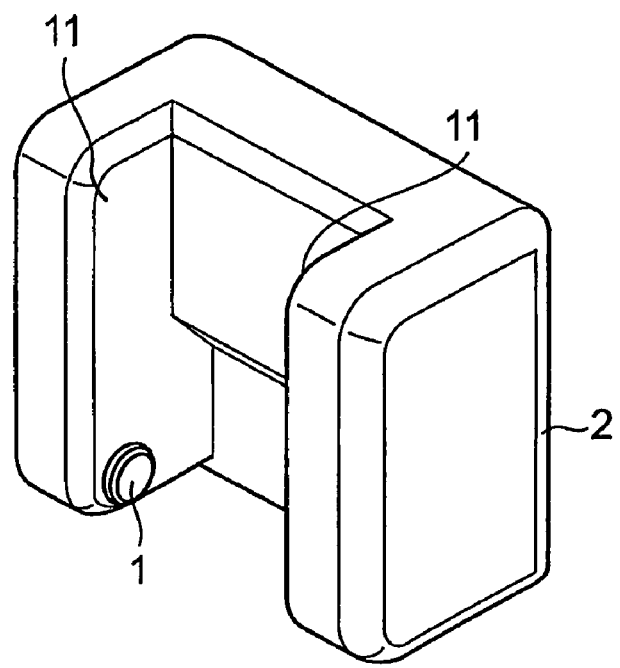
FIG. 2A is a perspective view of a slider included in the connector shown in FIG. 1.
Figure 2B:
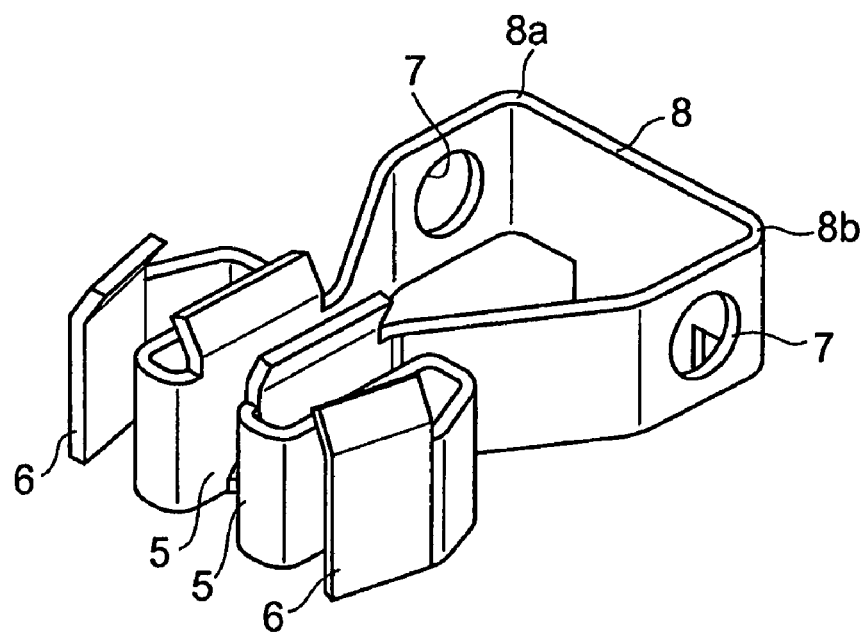
FIG. 2B is a perspective view of the main part of a contact included in the connector shown in FIG. 1.

Referring to FIGS. 1, 2A, and 2B, a description will be given of a lamp tube connector as a connecting member according to a first embodiment of this invention. The lamp tube connector is used for connecting, as a connection object, a fluorescent lamp tube such as a cold cathode-ray tube having lead wires.

The lamp tube connector comprises an insulating slider 2 having a pair of projections, i.e. rotation shafts (only one of which is shown) 1, and a conductive contact 3 combined with the slider 2. The contact 3 comprises a pair of contact pieces or contact portions 5 for connection to a lead wire 4 of a lamp tube as a connection object, a pair of pressing portions 6 connected to the contact portions 5, respectively, a rotation shaft receiving portion 8 having a pair of shaft holes 7 rotatably receiving the rotation shafts 1, respectively, and a board connecting portion 9 as a terminal portion for connection to a board.

The rotation shaft receiving portion 8 has a multi-sided structure with at least one corner. Herein, the rotation shaft receiving portion 8 has two corners 8a and 8b. A flexible link portion 10 is provided between at least one side, herein a side between the two corners 8a and 8b, of the rotation shaft receiving portion 8 and the board connecting portion 9. Herein, the link portion 10 is formed somewhat wider only in the vicinity of the rotation shaft receiving portion 8. The link portion 10 serves as a floating mechanism as will be described later.

According to the foregoing lamp tube connector, engaging portions 11 of the slider 2 press the pressing portions 6 of the contact 3 by rotating the slider 2 about the rotation shafts 1. This causes the contact portions 5 to move in mutually opposite directions perpendicular to the rotation plane of the slider 2 so as to be connected to the lead wire 4. A material of the slider 2 is not particularly limited and may be a metal.

Figure 3:
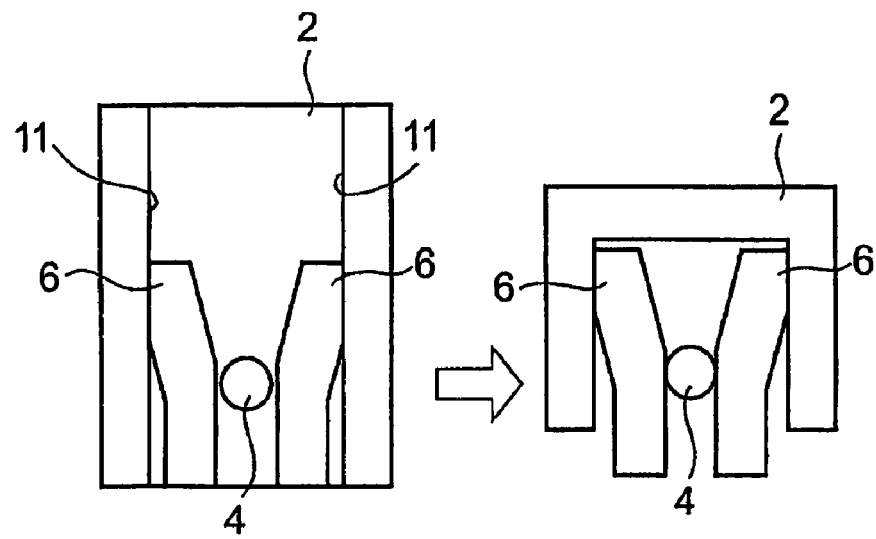
FIG. 3 is a diagram for explaining the operation of the connector shown in FIG. 1.

Referring also to an operation explanatory diagram of FIG. 3, a description of this operation will be supplemented. The contact 3 movably holds the slider 2. The movement of the slider 2 causes the engaging portions 11 to press the pressing portions 6 of the contact 3, thereby displacing the contact portions 5. As a result, the lead wire 4 of the lamp tube and the contact 3 are connected together.

As described above, since the slider 2 operates the pressing portions 6 of the contact 3 depending on its movement to thereby displace the contact portions 5, the assembly of a connection object such as a lamp tube is excellent and its replacement operation can also be facilitated.

Further, since the contact portions 5 are given floatability with respect to the board connecting portion 9 through the link portion 10, it is possible to reduce a stress of a connection object in the state where the connection object is kept in contact with the contact portions 5.

Consequently, it is possible to reduce stresses that are applied to a lead wire or lead wire sealing portion of a lamp tube, such as a stress that occurs due to a mounting position offset between a lamp tube and a connector which is caused when assembling a backlight module and a stress that occurs due to vibration or impact, thereby making it possible to provide a backlight module that does not damage lamp tubes or affect the lifetime of the lamp tubes.

The lamp tube connector shown in FIGS. 1 to 2B can be variously modified in the configuration relating to the contact portions 5 of the contact 3 and the rotation shafts 1 of the slider 2, as will be described hereinbelow.

Figure 4:
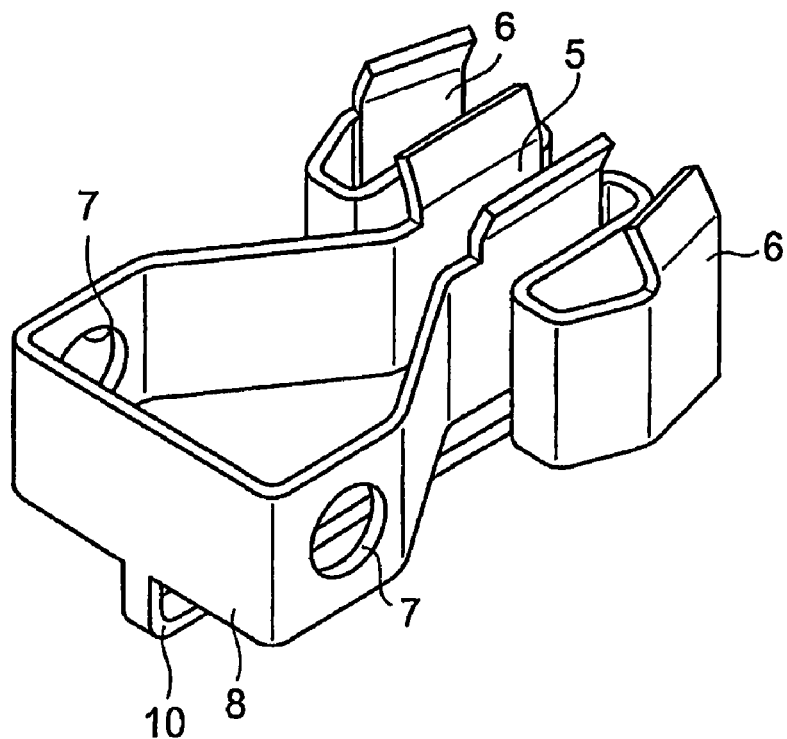
FIG. 4 is a perspective view showing a modification of the contact shown in FIG. 2B.
Figure 5:
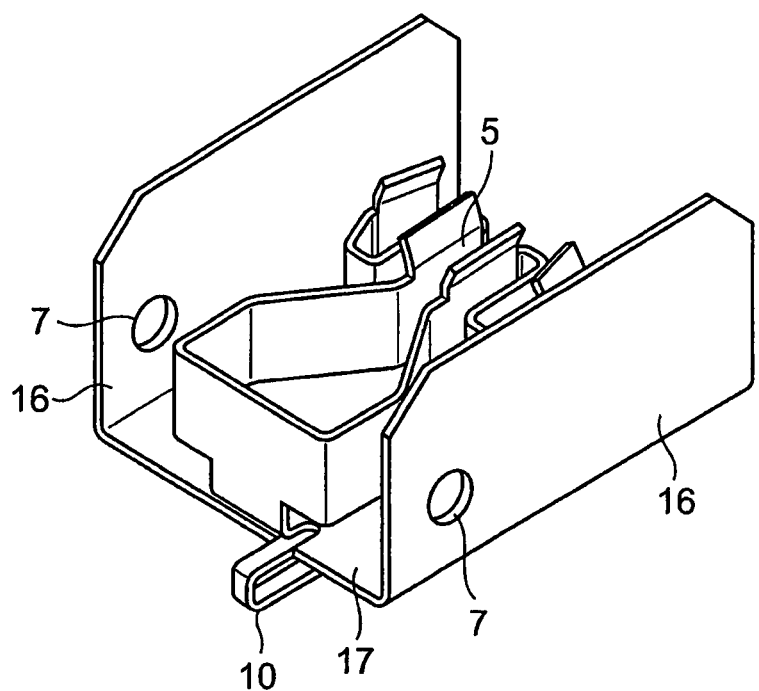
FIG. 5 is a perspective view showing another modification of the contact shown in FIG. 2B.
Figure 6:
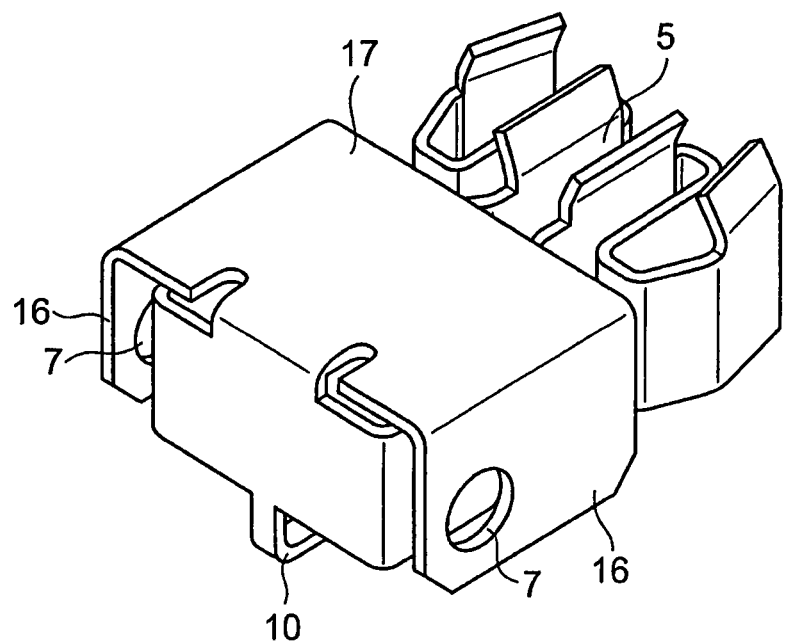
FIG. 6 is a perspective view showing still another modification of the contact shown in FIG. 2B.

In FIG. 4, a rotation shaft receiving portion 8 at a position adjacent to contact portions 5 is formed with a link portion 10 having a relatively narrow constant width. In FIG. 5, a bottom plate 17 is provided between contact portions 5 and a link portion 10 and formed with a pair of guide plates 16 and these guide plates 16 are formed with shaft holes 7 for receiving rotation shafts of a slider. In FIG. 6, a bottom plate 17 is provided at a position opposite to a link portion 10 with respect to contact portions 5 interposed therebetween and is formed with a pair of guide plates 16 and these guide plates 16 are formed with shaft holes 7 for receiving rotation shafts of a slider. These configurations are the same also in the case of having slide shafts which will be described later.

Figure 7:
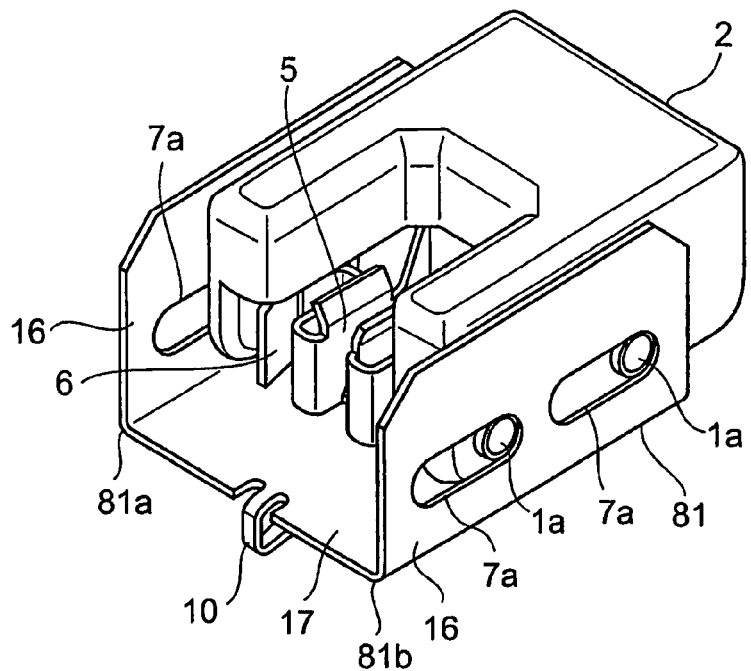
FIG. 7 is a perspective view of a connector according to a second embodiment of this invention.

Referring to FIG. 7, a description will be given of a lamp tube connector according to a second embodiment of this invention. In this lamp tube connector, the same reference symbols are assigned to the same or corresponding portions.

The lamp tube connector shown in FIG. 7 also comprises a slider 2 and a contact 3 combined with the slider 2. The slider 2 has slide shafts 1a. The contact 3 comprises contact portions 5 for connection to a lead wire of a lamp tube, pressing portions 6 adapted to be displaced by the slider 2, and a board connecting portion 9 (see FIGS. 16 and 17). A shaft receiving portion 81 comprises a bottom plate 17 provided between the contact portions 5 and a link portion 10 and a pair of guide plates 16 formed integrally with the bottom plate 17 and is formed with slide holes 7a each elongated in the front-rear direction and receiving the slide shafts 1a, respectively. With the slide shafts 1a being inserted into the slide holes 7a, the slider 2 is slidably held by the shaft receiving portion 81. The slide shafts 1a and the slide holes 7a cooperatively serve as a guide mechanism for guiding the slider 2 in a predetermined direction, for example, in a straight or curved line.

By operating the slider 2 in the front-rear direction along the slide holes 7a to press the pressing portions 6, the contact portions 5 are displaced in mutually opposite lateral directions so as to be connected to the lead wire of the lamp tube.

The shaft receiving portion 81 has a multi-sided structure with at least one corner. Herein, the shaft receiving portion 81 has two corners 81a and 81b. The flexible link portion 10 is provided between at least one side, herein a side between the two corners 81a and 81b, of the shaft receiving portion 81 and the board connecting portion 9.

Figure 8:
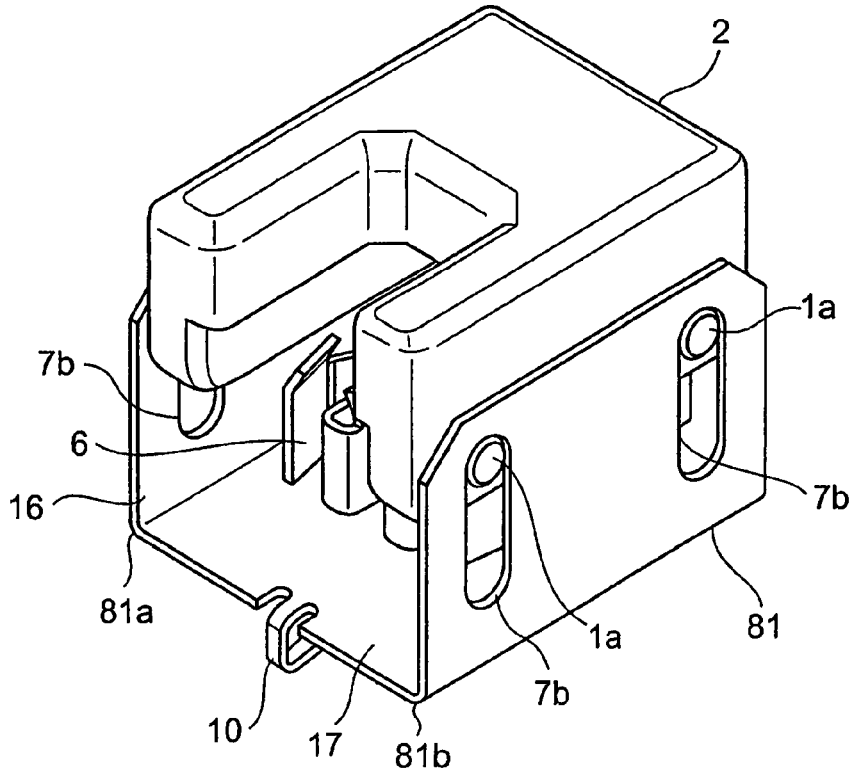
FIG. 8 is a perspective view showing a modification of the connector shown in FIG. 7.

FIG. 8 shows a modification of the lamp tube connector shown in FIG. 7. In the lamp tube connector of FIG. 8, slide holes 7b are each elongated in the up-down direction. By operating a slider 2 in the up-down direction along the slide holes 7b to press pressing portions 6, contact portions 5 are displaced in mutually opposite lateral directions so as to be connected to a lead wire of a lamp tube.

Figure 9A:
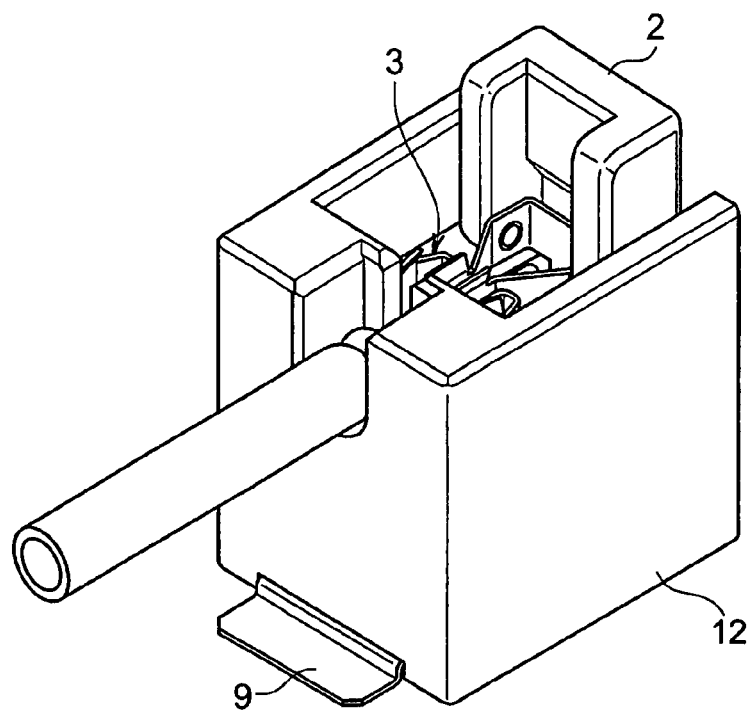
FIGS. 9A and 9B are perspective views, as seen from different directions, respectively, of a connector according to a third embodiment of this invention.
Figure 9B:
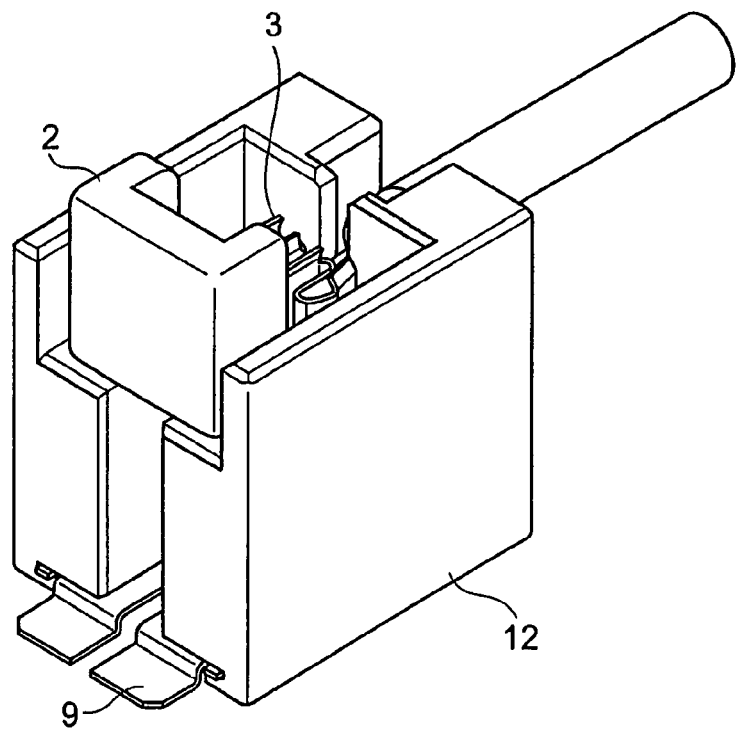

Referring to FIGS. 9A and 9B, a description will be given of a lamp tube connector according to a third embodiment of this invention. Also in this lamp tube connector, the same reference symbols are assigned to the same or corresponding portions.

In this lamp tube connector, a slider 2 and a contact 3 are incorporated in a housing 12. The housing 12 is press-fitted or locked onto a board connecting portion 9 of the contact 3 so as to be held. Contact portions 5 of the contact 3 and the slider 2 have floatability with respect to the board connecting portion 9 of the contact 3 and the housing 12.

Figure 10:
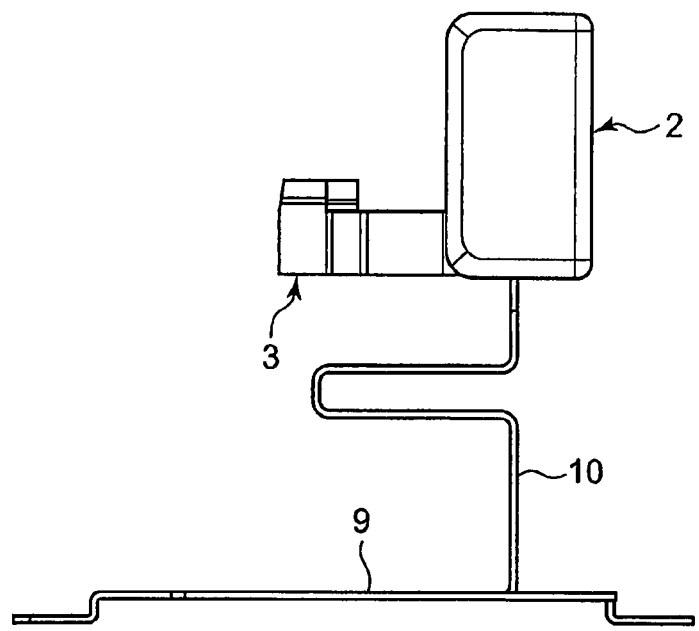
FIG. 10 is a diagram for explaining a floating mechanism included in the connector shown in FIGS. 9A and 9B.

Referring to FIG. 10, a floating mechanism will be described.

A flexible link portion 10 is connected between the contact portions 5 of the contact 3 and rotation shafts 1 or slide shafts 1a of the slider 2, and the board connecting portion 9. Through the link portion 10, the contact portions 5 of the contact 3 and the slider 2 have floatability with respect to the board connecting portion 9 of the contact 3 so as to be freely movable three-dimensionally.

Figure 11:
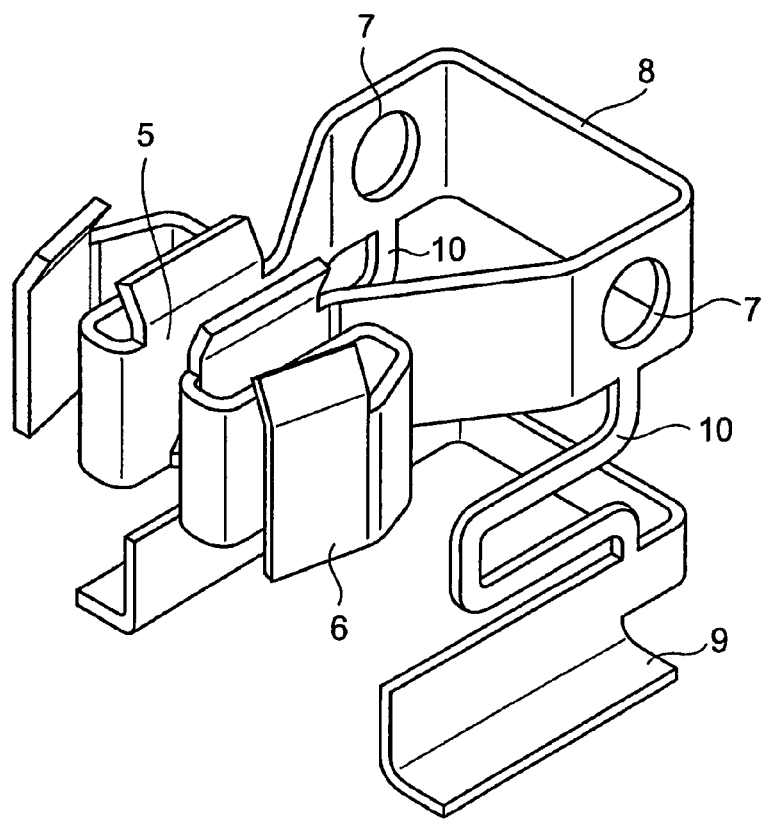
FIG. 11 is a perspective view showing a modification of a contact included in the connector shown in FIGS. 9A and 9B.

FIG. 11 shows a modification of the contact 3. The contact 3 shown in FIG. 11 has a pair of link portions 10 between a rotation shaft receiving portion 8 and a board connecting portion 9.

Figure 12:
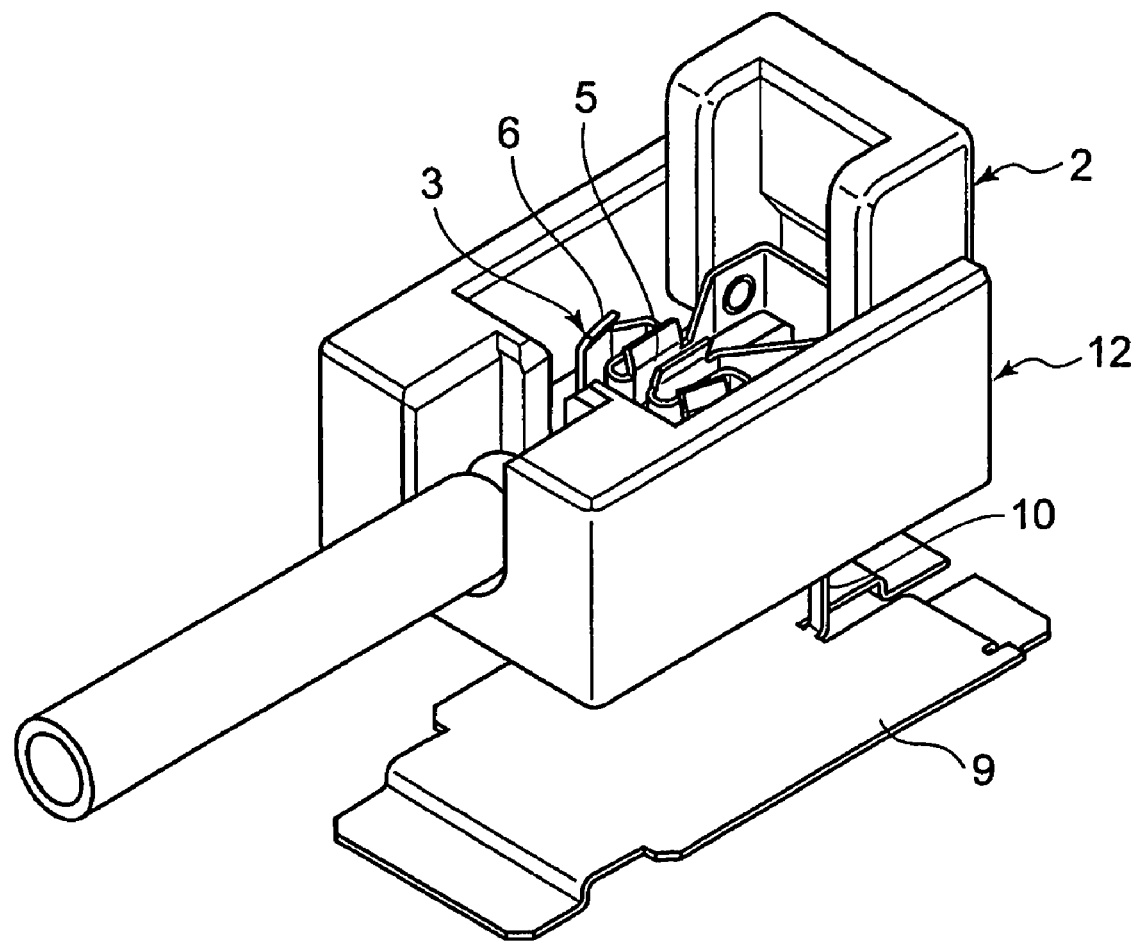
FIG. 12 a perspective view showing a connector according to a fourth embodiment of this invention along with a lamp tube.
Figure 13:
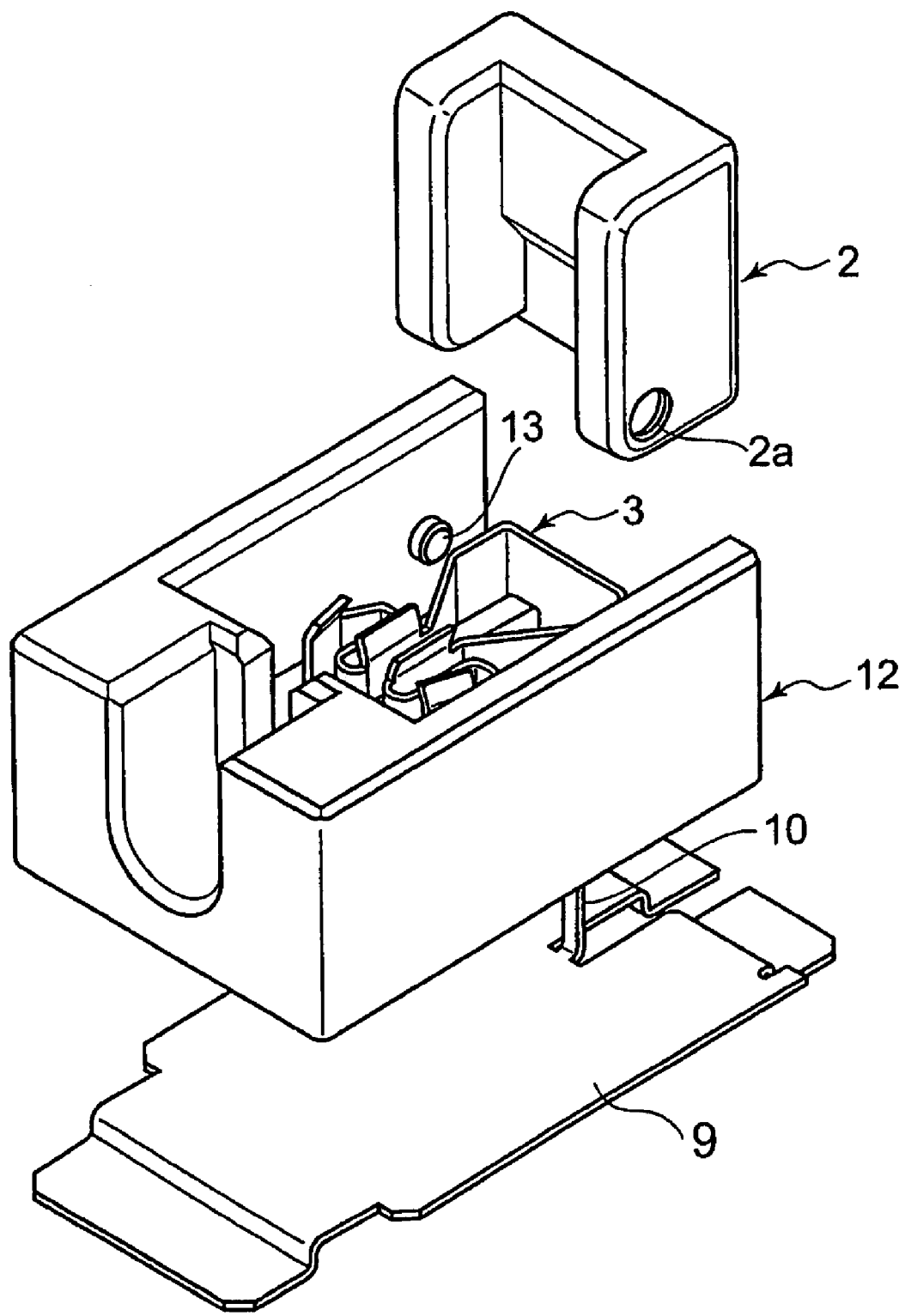
FIG. 13 is an exploded perspective view of the connector shown in FIG. 12.
Figure 14:
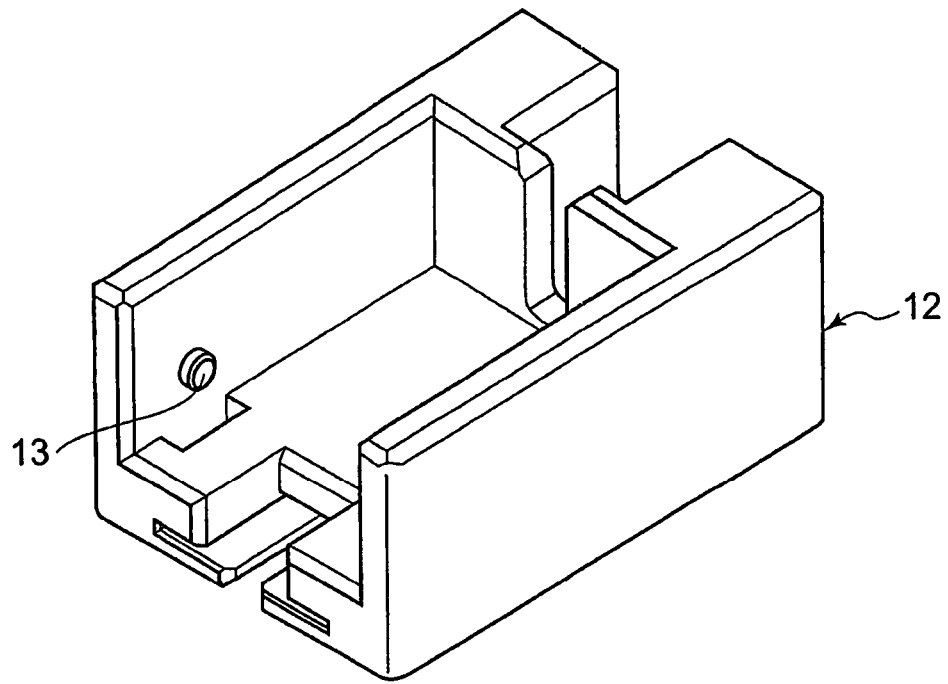
FIG. 14 is a perspective view of a housing included in the connector shown in FIG. 12.

Referring to FIGS. 12 to 14, a description will be given of a lamp tube connector according to a fourth embodiment of this invention. Also in this lamp tube connector, the same reference symbols are assigned to the same or corresponding portions.

The lamp tube connector shown in FIGS. 12 to 14 comprises a slider 2 having recesses 2a serving as shaft holes, a contact 3 having contact portions 5 for connection to a lead wire of a lamp tube, pressing portions 6 adapted to displace the contact portions 5 by movement of the slider 2, and a board connecting portion 9, and a housing 12 having projections, i.e. rotation shafts 13, rotatably fitted into the recesses 2a. With the rotation shafts 13 being fitted into the recesses 2a, the slider 2 is rotatably held by the housing 12. By rotating the slider 2 to press the pressing portions 6 of the contact 3, the contact portions 5 are displaced in mutually opposite directions perpendicular to the rotation plane of the slider 2 so as to be connected to the lead wire of the lamp tube. A link portion 10 allows the contact portions 5, the pressing portions 6, the slider 2, and the housing 12 to have floatability with respect to the board connecting portion 9.

Figure 15:
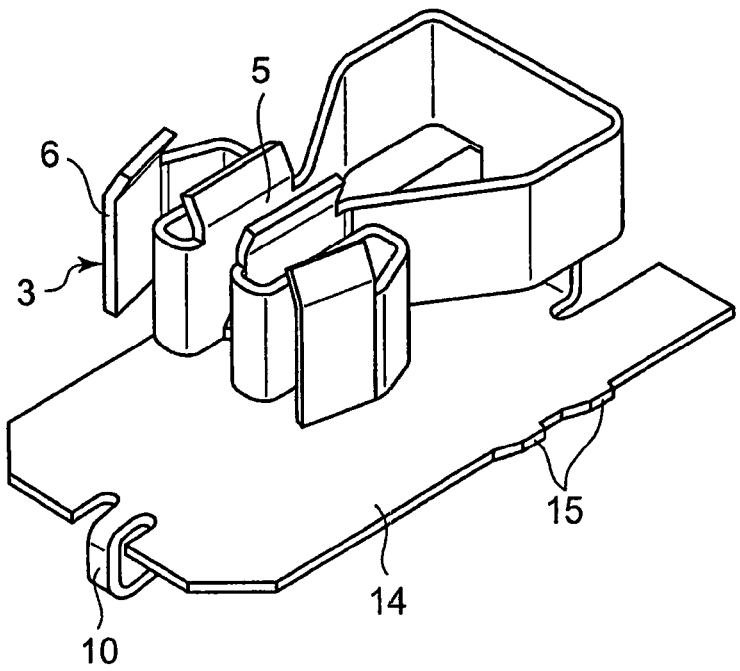
FIG. 15 is a perspective view showing a modification of a contact included in the connector shown in FIG. 12.

In the lamp tube connector shown in FIG. 12, a contact 3 shown in FIG. 15 may be used. In the contact 3 of FIG. 15, a holding portion 14 for holding a housing 12 is formed separately from a board connecting portion 9. In this case, projections 15 of the holding portion 14 are press-fitted or locked into the housing 12, thereby holding the housing 12.

Figure 16:
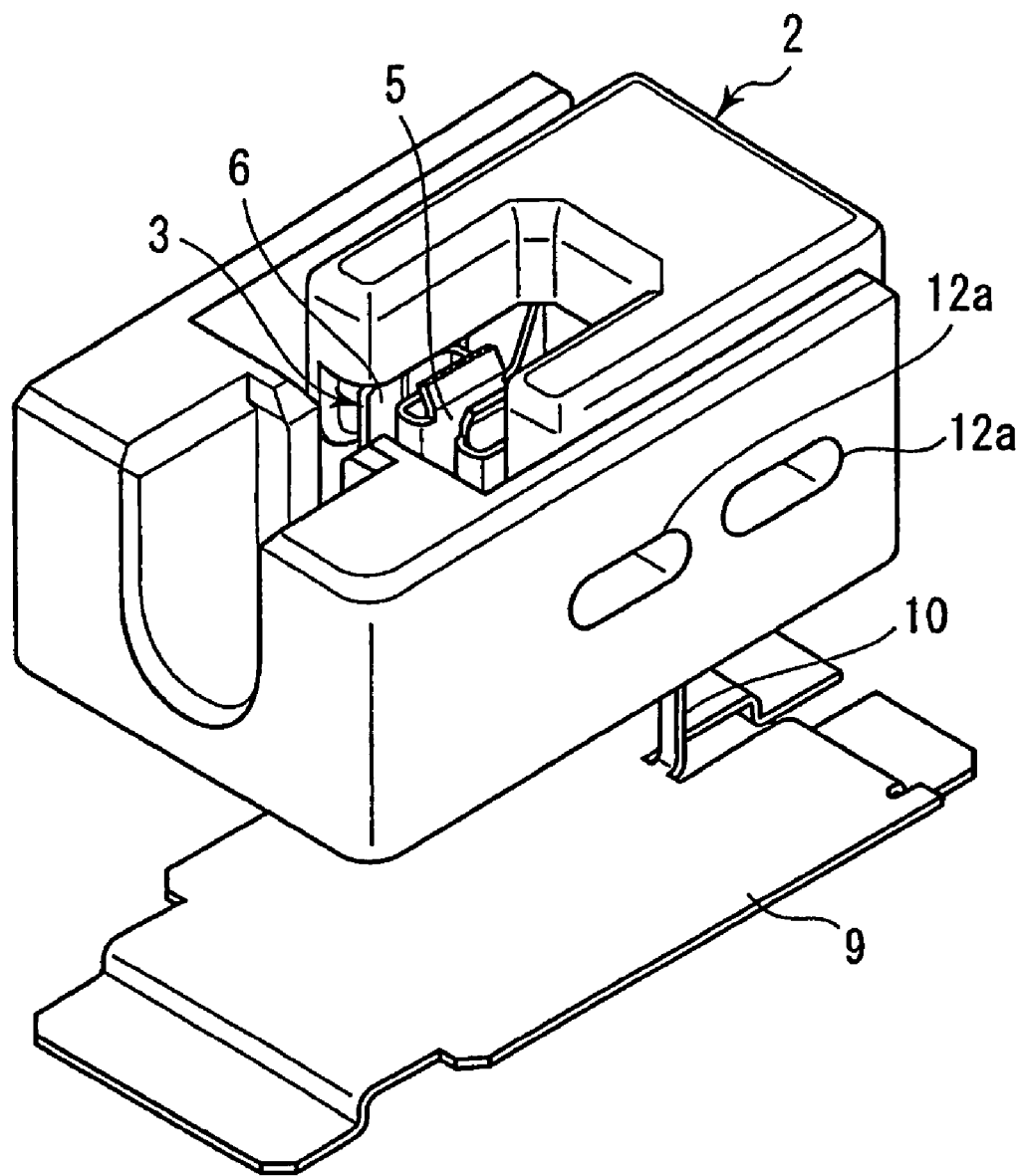
FIG. 16 is a perspective view of a connector according to a fifth embodiment of this invention.

Referring to FIG. 16, a description will be given of a lamp tube connector according to a fifth embodiment of this invention. Also in this lamp tube connector, the same reference symbols are assigned to the same or corresponding portions.

The lamp tube connector shown in FIG. 16 also comprises a slider 2, a contact 3 combined with the slider 2, and a housing 12 accommodating them. The slider 2 has slide shafts as denoted by symbol 1a in FIGS. 7 and 8. The contact 3 comprises contact portions 5 for connection to a lead wire of a lamp tube, pressing portions 6 adapted to be displaced by the slider 2, and a board connecting portion 9. The housing 12 is formed with slide holes 12a each elongated in the front-rear direction and receiving the slide shafts, respectively. With the slide shafts being inserted into the slide holes 12a, the slider 2 is slidably held by the housing 12. That is, part of the housing 12 serves as a slide shaft receiving portion.

By operating the slider 2 in the front-rear direction along the slide holes 12a to press the pressing portions 6, the contact portions 5 are displaced in mutually opposite lateral directions so as to be connected to the lead wire of the lamp tube.

Figure 17:
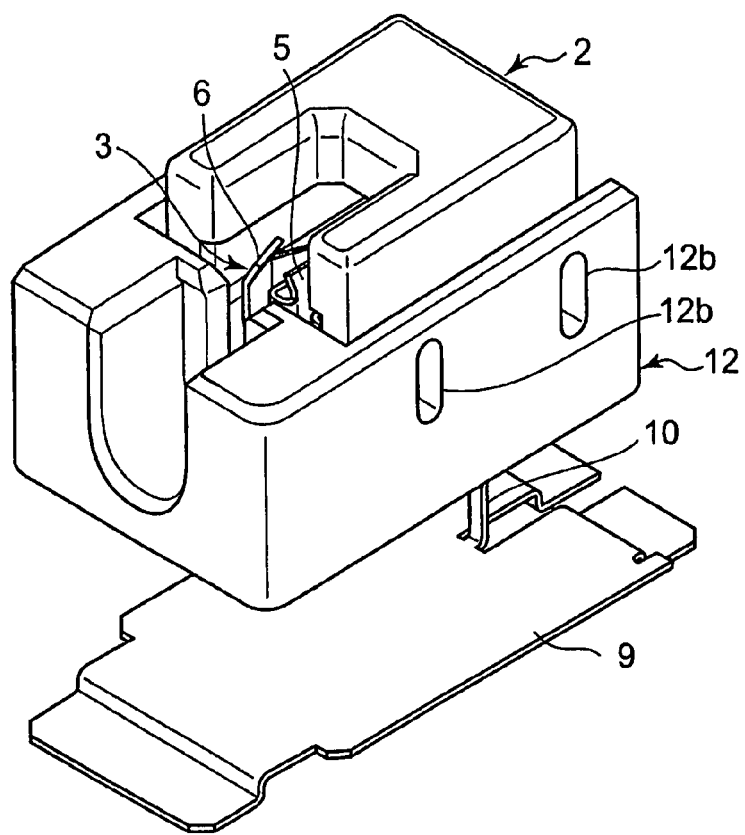
FIG. 17 is a perspective view showing a modification of the connector shown in FIG. 16.

FIG. 17 shows a modification of the lamp tube connector shown in FIG. 16. In the lamp tube connector of FIG. 17, a housing 12 is formed with slide holes 12b each elongated in the up-down direction and receiving slide shafts of a slider 2, respectively. By operating the slider 2 in the up-down direction along the slide holes 12b to press pressing portions 6, contact portions 5 are displaced in mutually opposite lateral directions so as to be connected to a lead wire of a lamp tube.

Figure 18:
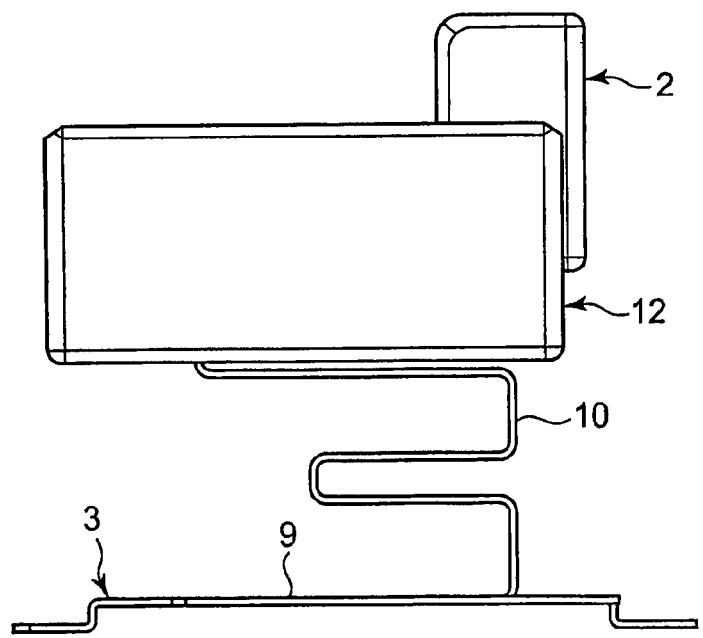
FIG. 18 is a side view showing an example of the shape of a floating mechanism included in the connector shown in FIG. 16.

FIG. 18 shows an example of the shape of a link portion 10 forming a floating mechanism. It is preferable to increase the floating amount or enhance the floatability by forming the link portion 10 into a zigzag shape as illustrated in the figure.

In any of the foregoing embodiments, before the slider 2 presses the pressing portions 6 of the contact 3, the contact portions 5 are in a natural state and define therebetween a gap wider than the outer diameter of the lead wire 4 of the lamp tube. Accordingly, the lead wire 4 can be placed between the contact portions 5 with no resistance when assembling the lamp tube and, thus, there is obtained an effect of making it easy to assemble the lamp tube. Further, since the contact of the contact portions 5 with the lead wire 4 of the lamp tube can be released relatively easily by releasing the slider 2, there is also obtained an effect of making it easy to replace the lamp tube. Accordingly, it is possible to reduce the number of working processes for assembling and replacing the lamp tube. Further, even when the pressing portions 6 are pressed by the slider 2 to connect the contact portions 5 to the lead wire 4 of the lamp tube, the contact portions 5 and the slider 2 have the floatability with respect to the board connecting portion 9 of the contact 3 and, therefore, there is obtained an effect of reducing a stress of the lead wire 4 of the lamp tube while the contact is maintained.

Any of the lamp tube connectors described with reference to FIGS. 1 to 18 is configured such that the engaging portions 11 of the slider 2 press the pressing portions 6 of the contact 3 to displace the contact portions 5, thereby connecting the contact portions 5 to the lead wire 4 of the lamp tube.

In the lamp tube connector configured as described above, before the slider 2 presses the pressing portions 6 of the contact 3, the contact portions 5 are in a natural state and define therebetween a gap wider than the outer diameter of the lead wire 4 of the lamp tube. Accordingly, the lead wire 4 of the lamp tube can be disposed between the contact portions 5 with no resistance and, thus, the assembly of the lamp tube is excellent.

Further, when the pressing of the pressing portions 6 by the slider 2 is released, the contact portions 5 are restored to the natural state by an elastic restoring force of the contact 3 to release the contact with the lead wire 4 of the lamp tube. Therefore, it is possible to easily carry out a replacement operation of the lamp tube.

Moreover, even when the pressing portions 6 are pressed by the slider 2 to connect the contact portions 5 to the lead wire 4 of the lamp tube, the contact portions 5 have the floatability with respect to the board connecting portion 9 of the contact 3 and, therefore, it is possible to reduce a stress of the lead wire 4 of the lamp tube in the state where the contact is maintained.

On the other hand, like various lamp tube connectors which will be described hereinbelow with reference to FIG. 19A and subsequent figures, it is possible to configure that engaging portions 11 of a slider 2 press pressing portions 6 of a contact 3, thereby displacing contact portions 5 of the contact 3 in mutually opposite directions away from a lead wire 4 of a lamp tube. In this case, the contact portions 5 are brought into pressure contact with the lead wire 4 of the lamp tube by an elastic restoring force of the contact 3.

Referring to FIGS. 19A to 21, a description will be given of a lamp tube connector according to a sixth embodiment of this invention. Also in this lamp tube connector, the same reference symbols are assigned to the same or corresponding portions.

The lamp tube connector shown in FIGS. 19A to 21 also comprises a slider 2 and a contact 3 combined with the slider 2. The contact 3 has a pair of guide plates 16 facing each other with contact portions 5 and pressing portions 6 interposed therebetween and a bottom plate 17 connected between the guide plates 16. The bottom plate 17 is connected to a board connecting portion 9 through a link portion 10.

The guide plates 16 rotatably (or pivotally) support rotation shafts 1a of the slider 2. The rotation of the slider 2 is guided by a guide mechanism comprising arc-shaped guide holes 18 of the guide plates 16 and guide projections 19 of the slider 2 inserted into the guide holes 18, respectively.

Figure 19A:
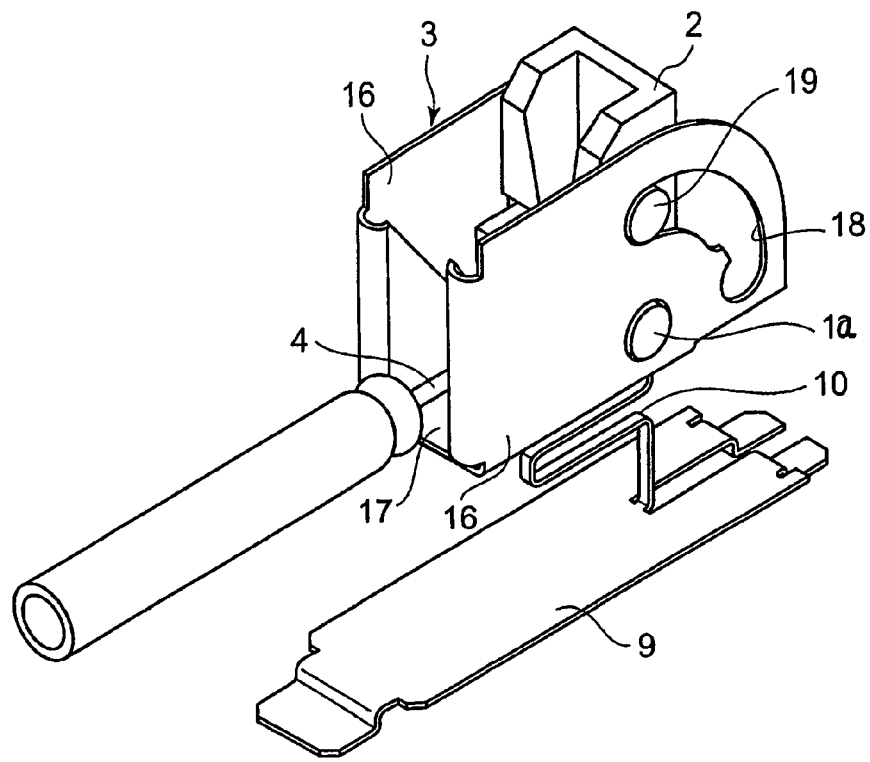
FIG. 19A is a perspective view showing a connector according to a sixth embodiment of this invention along with a lamp tube in the state before the lamp tube is connected to the connector.

In the state before a lamp tube is connected to the connector as shown in FIGS. 19A and 20A, the slider 2 presses the pressing portions 6 of the contact 3 to displace the contact portions 5 in mutually opposite directions away from each other, i.e. to increase a gap between the contact portions 5, thereby facilitating insertion of a lead wire 4 of the lamp tube between the contact portions 5.

Figure 19B:
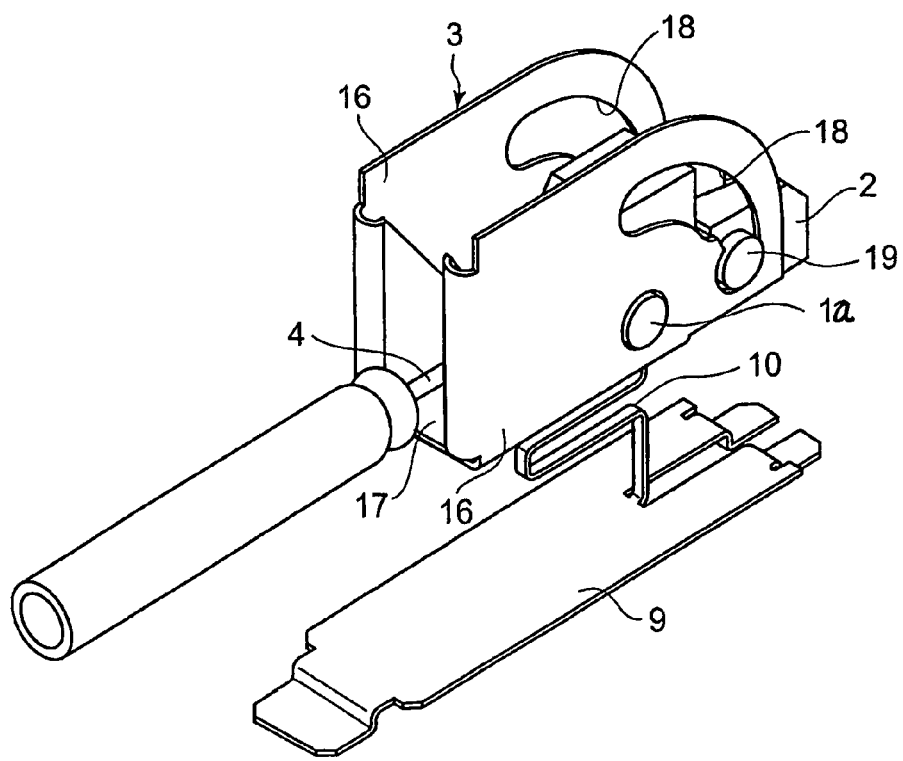
FIG. 19B is a perspective view in the state where the lamp tube is connected to the connector shown in FIG. 19A.

As shown in FIGS. 19B and 20B, when the slider 2 is rotated about the rotation shafts 1a, the slider 2 is separated from the pressing portions 6 of the contact 3, so that the contact portions 5 are brought into pressure contact with the lead wire 4 of the lamp tube by an elastic restoring force of the contact 3. Consequently, the lead wire 4 of the lamp tube is connected to the contact 3.

Figure 22:
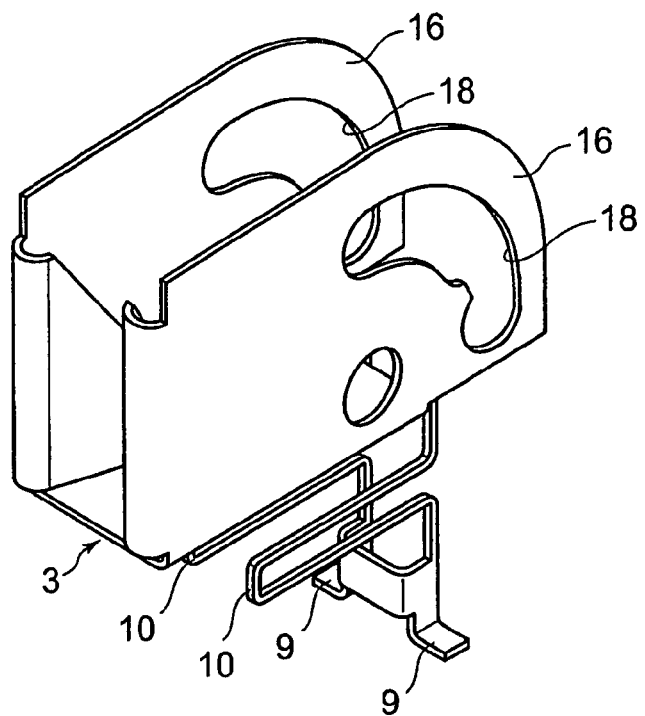
FIG. 22 is a perspective view of a contact included in a modification of the connector shown in FIGS. 19A and 19B.

FIG. 22 shows a contact used in a modification of the lamp tube connector shown in FIGS. 19A to 21. As illustrated, a plurality of link portions 10 may be provided.

Figure 23:
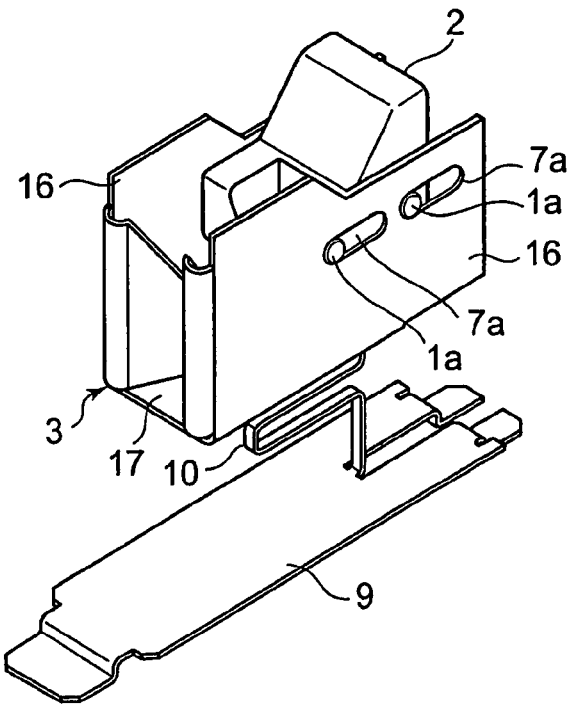
FIG. 23 is a perspective view showing another modification of the connector shown in FIGS. 19A and 19B in the state before a lamp tube is connected to the connector.

FIG. 23 shows another modification of the lamp tube connector shown in FIGS. 19A to 21. Also in this lamp tube connector, the same reference symbols are assigned to the same or corresponding portions. This lamp tube connector has substantially the same configuration and function as those of the lamp tube connector shown in FIG. 7 except that a slider 2 displaces contact portions of a contact 3 in mutually opposite directions away from a lead wire of a lamp tube.

Figure 24:
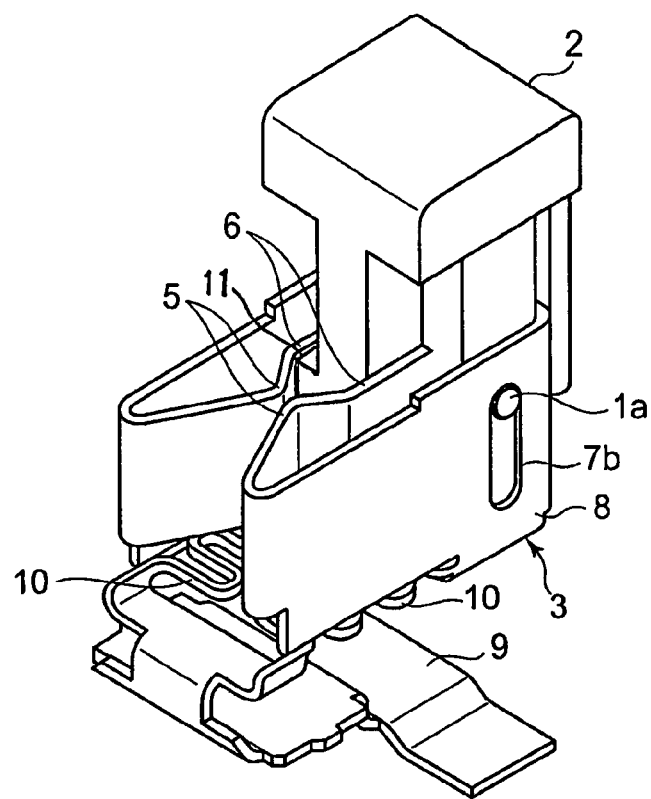
FIG. 24 is a perspective view showing still another modification of the connector shown in FIGS. 19A and 19B in the state before a lamp tube is connected to the connector.

FIG. 24 shows still another modification of the lamp tube connector shown in FIGS. 19A to 21. Also in this lamp tube connector, the same reference symbols are assigned to the same or corresponding portions. This lamp tube connector has substantially the same configuration and function as those of the lamp tube connector shown in FIG. 8 except that a slider 2 displaces contact portions of a contact 3 in mutually opposite directions away from a lead wire of a lamp tube.

Figure 25:
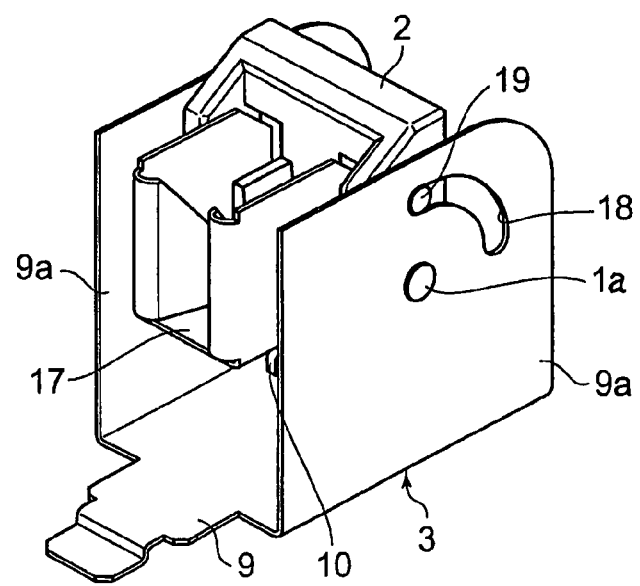
FIG. 25 is a perspective view of a connector according to a seventh embodiment of this invention.

Referring to FIG. 25, a description will be given of a lamp tube connector according to a seventh embodiment of this invention. Also in this lamp tube connector, the same reference symbols are assigned to the same or corresponding portions.

The lamp tube connector shown in FIG. 25 also comprises a slider 2 and a contact 3 combined with the slider 2. A pair of side plates 9a are fixedly connected to a board connecting portion 9 of the contact 3. The slider 2 is disposed between the side plates 9a. Rotation shafts 1a of the slider 2 are rotatably supported by the side plates 9a, respectively. The rotation of the slider 2 is guided by a guide mechanism comprising arc-shaped guide holes 18 of the contact 3 and guide projections 19 of the slider 2 inserted into the guide holes 18, respectively. The board connecting portion 9 is connected to a bottom plate 17 through a link portion 10.

Figure 26:
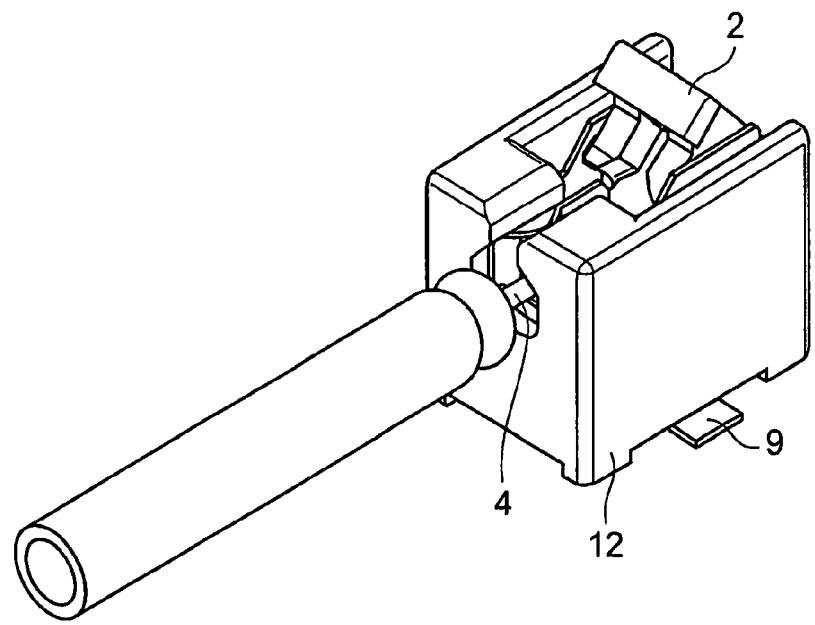
FIG. 26 is a perspective view showing a connector according to an eighth embodiment of this invention along with a lamp tube.
Figure 27:
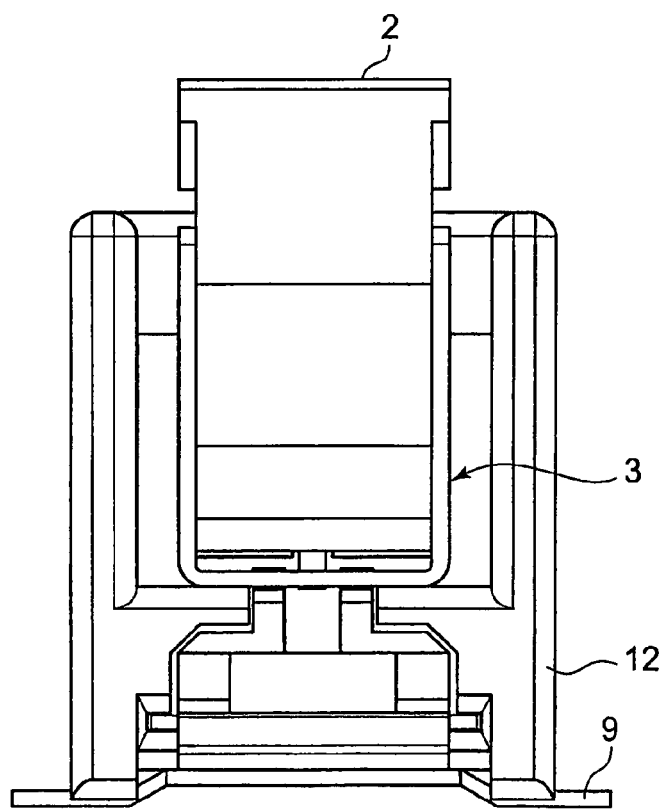
FIG. 27 is a rear view of the connector shown in FIG. 26.

Referring to FIGS. 26 and 27, a description will be given of a lamp tube connector according to an eighth embodiment of this invention. Also in this lamp tube connector, the same reference symbols are assigned to the same or corresponding portions.

In this lamp tube connector, a housing 12 is press-fitted or locked onto a board connecting portion 9 of a contact 3 so as to be held. This lamp tube connector has substantially the same configuration and function as those of the lamp tube connector shown in FIGS. 9A and 9B except that a slider 2 displaces contact portions of the contact 3 in mutually opposite directions away from a lead wire 4 of a lamp tube.

Figure 28:
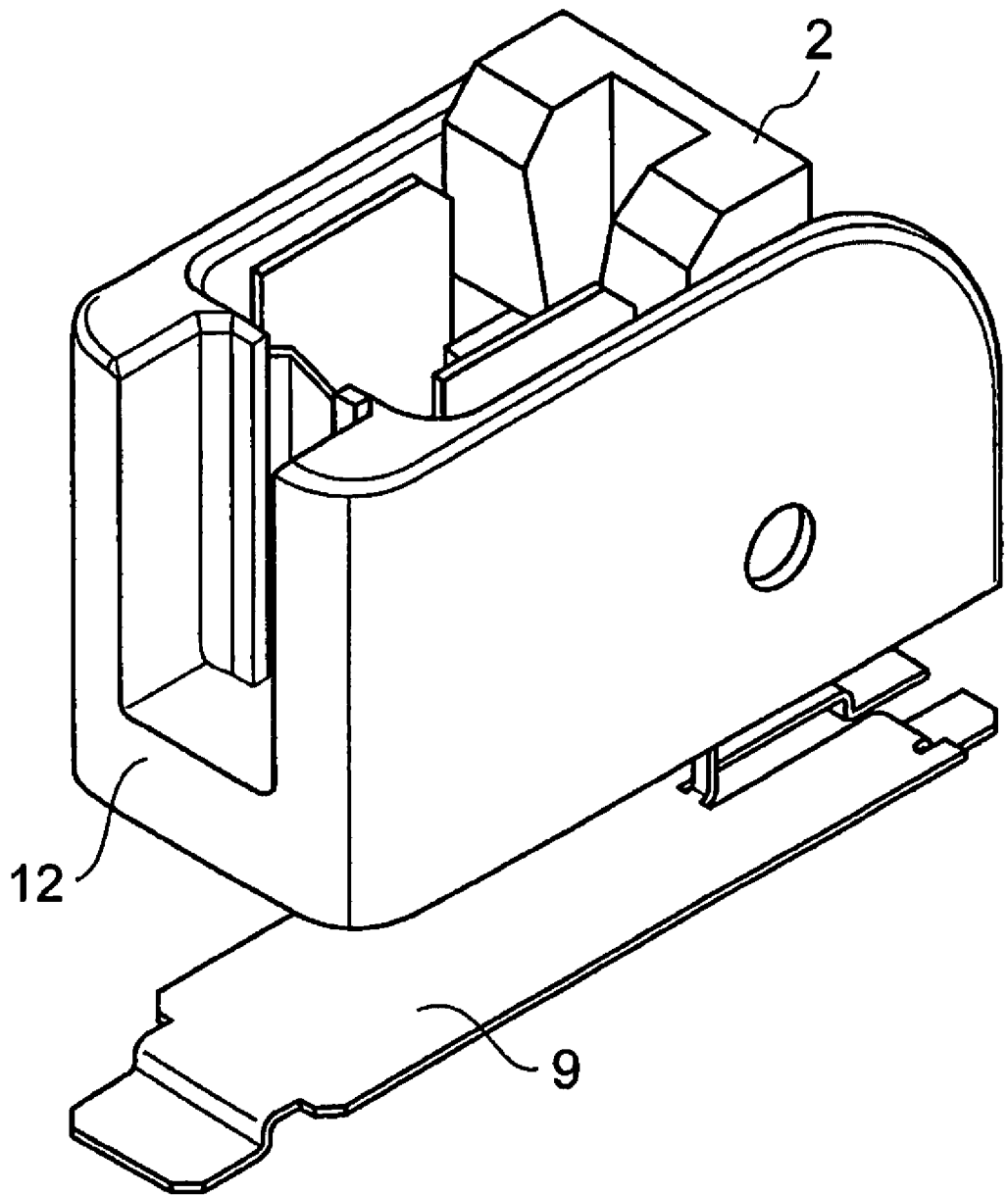
FIG. 28 is a perspective view of a connector according to a ninth embodiment of this invention in the state where a lamp tube is connected to the connector.
Figure 29:
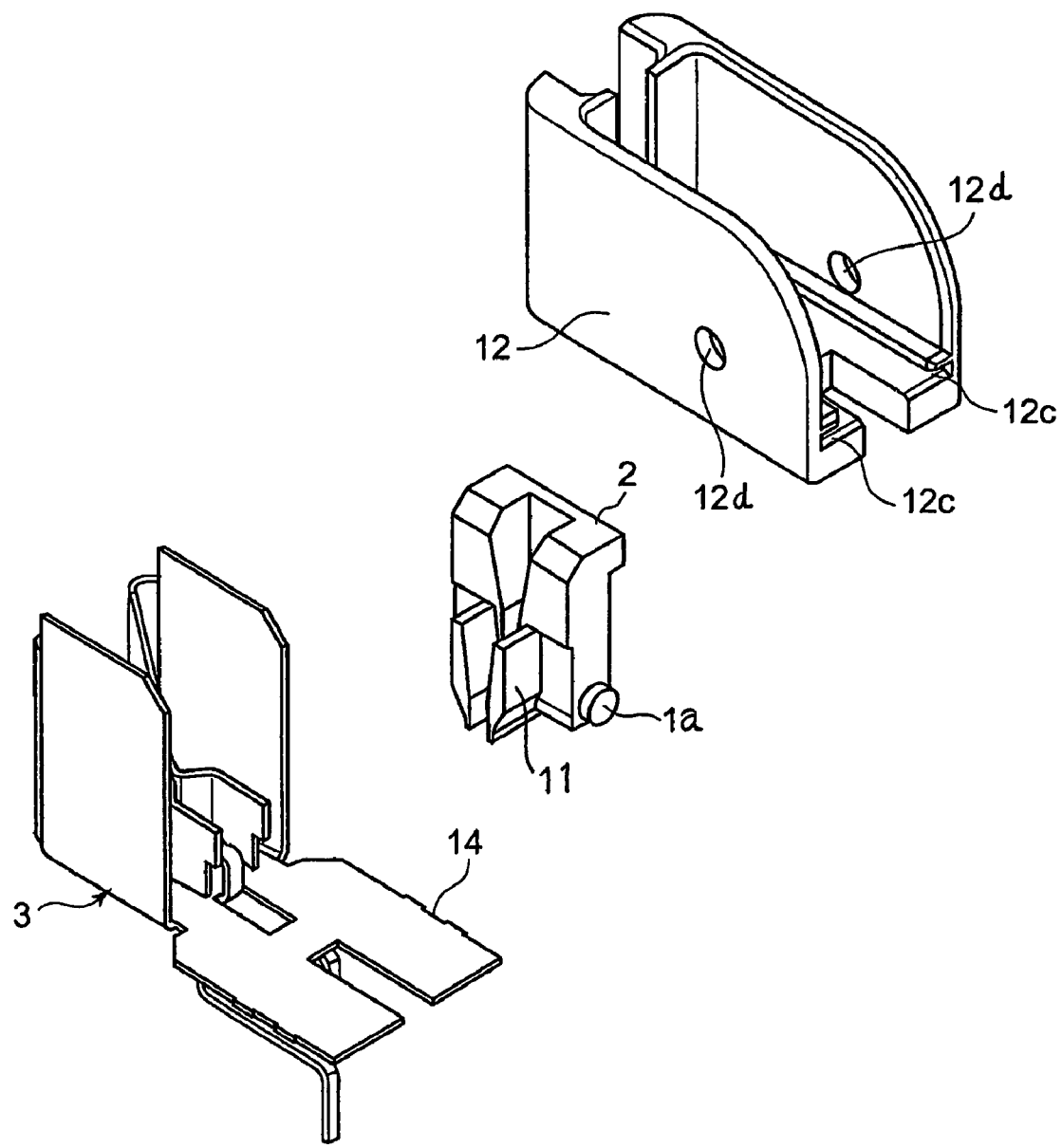
FIG. 29 is an exploded perspective view of the connector shown in FIG. 28.

FIGS. 28 and 29 show a lamp tube connector according to a ninth embodiment of this invention. Also in this lamp tube connector, the same reference symbols are assigned to the same or corresponding portions.

In this lamp tube connector, a housing 12 has holding grooves 12c. Holding portions 14 of a contact 3 are press-fitted or locked into the holding grooves 12c, so that the housing 12 is held by the contact 3. A slider 2 has rotation shafts 1a. By fitting the rotation shafts 1a into rotation shaft receiving portions 12d of the housing 12, the slider 2 is rotatably supported by the housing 12 using the rotation shafts 1a as fulcrums. This lamp tube connector has substantially the same function as that of the lamp tube connector shown in FIG. 13 except that the slider 2 displaces contact portions of the contact 3 in mutually opposite directions away from a lead wire of a lamp tube.

Figure 30:
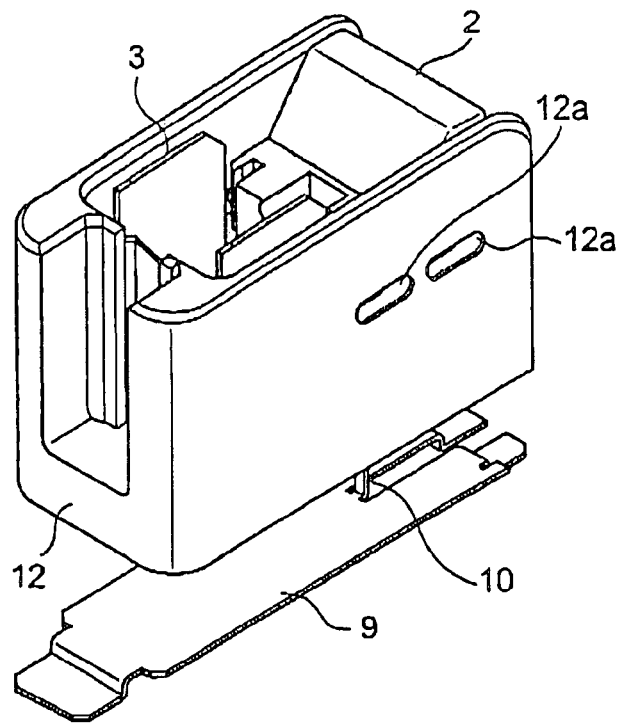
FIG. 30 is a perspective view showing a modification of the connector shown in FIG. 28.

FIG. 30 shows a modification of the lamp tube connector shown in FIGS. 28 and 29. Also in this lamp tube connector, the same reference symbols are assigned to the same or corresponding portions. This lamp tube connector has substantially the same configuration and function as those of the lamp tube connector shown in FIG. 16 except that a slider 2 displaces contact portions of a contact 3 in mutually opposite directions away from a lead wire of a lamp tube.

Figure 31:
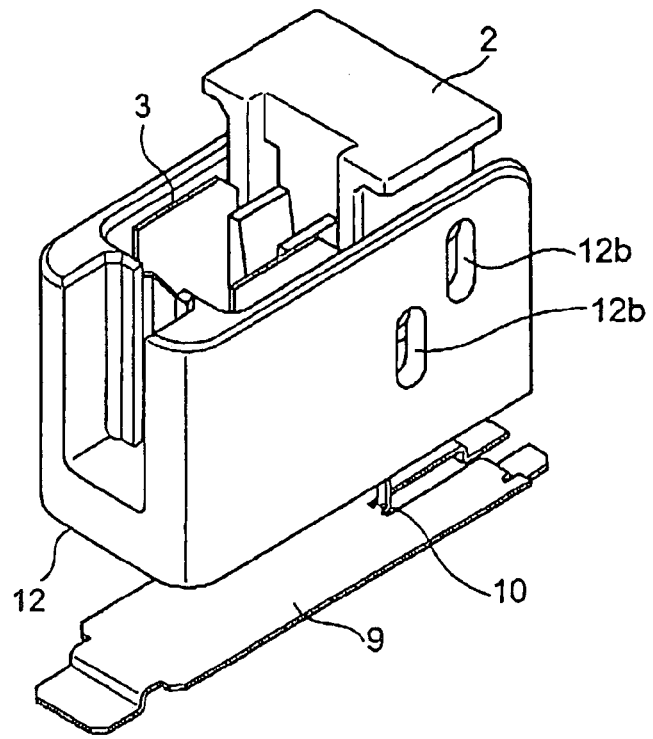
FIG. 31 is a perspective view showing another modification of the connector shown in FIG. 28.

FIG. 31 shows another modification of the lamp tube connector shown in FIGS. 28 and 29. Also in this lamp tube connector, the same reference symbols are assigned to the same or corresponding portions. This lamp tube connector has substantially the same configuration and function as those of the lamp tube connector shown in FIG. 17 except that a slider 2 displaces contact portions of a contact 3 in mutually opposite directions away from a lead wire of a lamp tube.

In the lamp tube connectors configured as described above, the contact portions 5 can ensure sufficient contact with the lead wire 4 of the lamp tube in a natural state, while, when the slider 2 presses the pressing portions 6 of the contact 3 to displace the contact portions 5 in mutually opposite directions away from each other, the contact portions 5 form therebetween a gap wider than the outer diameter of the lead wire 4 of the lamp tube. Accordingly, the lead wire 4 can be disposed between the contact portions 5 with no resistance when assembling the lamp tube and, thus, the assembly of the lamp tube is excellent.

When replacing the lamp tube, since the contact portions 5 of the contact 3 are again displaced to increase the gap therebetween through the operation of the slider 2, the contact with the lead wire 4 of the lamp tube is released and thus the lamp tube can be detached with no resistance. Therefore, it is possible to carry out a replacement operation of the lamp tube relatively easily.

Further, the contact portions 5 of the contact 3 have the floatability with respect to the board connecting portion 9 of the contact 3 while maintaining the contact with the lead wire 4 of the lamp tube and, therefore, it is possible to reduce a stress of the lead wire 4 of the lamp tube in the state where the contact is maintained.

In the foregoing various embodiments, the combination of the rotation shafts 1 or 13 and the shaft holes 7 or 2a, which serves as the rotation axis, or the combination of the slide shafts 1a and the slide holes 7a, 7b, 12a, or 12b, which serves as the slide axis, is provided between the slider and one of the housing and the contact. However, it may be provided between a slider and each of a housing and a contact so that the slider is rotatably or slidably held by both the housing and the contact.

In the case of the slide configuration, the description has been given of the example where the contact or the housing has the slide holes and the slider has the slide shafts. Conversely, it may also be arranged that a contact or a housing has slide shafts and a slider has slide holes.

While the present invention has thus far been described in connection with a few embodiments thereof, it will readily be possible for those skilled in the art to put this invention into practice in various other manners. For example, it is possible to employ the configuration in which the slider slides parallel to a lamp tube or the slider slides perpendicular to a lamp tube. In addition, it is also possible to employ a configuration in which a slider slides in a direction oblique to a lamp tube, a multi-step slide configuration in which a slider slides in one direction and then in another direction, a configuration in which a slider slides and rotates, or the like. The foregoing lamp tube connectors are each applicable as a direct-type lamp socket for connecting a fluorescent lamp tube such as a cold cathode-ray tube in a backlight module of a large liquid crystal display.

What is claimed is:

1. A connector for connecting a lamp tube having a lead wire, comprising:
   a contact which comprises a contact portion for contact with the lead wire and a pressing portion near the contact portion; and
   a slider which is movable with respect to the contact;
   wherein the slider operates the pressing portion depending on movement of the slider to thereby displace the contact portion, and
   wherein the contact further comprises:
   a slider receiving portion receiving the slider;
   a board connecting portion for connection to a board; and
   a flexible link portion interposed between the slider receiving portion and the board connecting portion.

2. The connector according to claim 1, wherein the contact further comprises a slider receiving portion receiving the slider, wherein the slider is rotatably supported by the slider receiving portion.

3. The connector according to claim 1, wherein the contact further comprises a slider receiving portion receiving the slider, wherein the slider is slidably supported by the slider receiving portion.

4. The connector according to claim 1, further comprising a housing which accommodates the contact portion, the pressing portion, and the slider so as to be slidable in a predetermined direction with flexure of the link portion.

5. The connector according to claim 1, further comprising a housing which accommodates the contact portion, the pressing portion, and the slider, wherein the slider is rotatably supported by the housing.

6. The connector according to claim 1, further comprising a housing which accommodates the contact portion, the pressing portion, and the slider, wherein the slider is slidably supported by the housing.

7. The connector according to claim 5, wherein the contact further comprises:
   a holding portion held by the housing;
   a board connecting portion for connection to a board; and
   a flexible link portion interposed between the holding portion and the board connecting portion.

8. A connector for connecting a lamp tube having a lead wire, comprising:
   a contact which comprises a contact portion for contact with the lead wire and a pressing portion near the contact portion; and
   a slider which is movable with respect to the contact;

wherein the slider operates the pressing portion depending on movement of the slider to thereby displace the contact portion, and wherein the contact further comprises:

a board connecting portion for connection to a board;

a flexible link portion interposed between the pressing portion and the board connecting portion; and a slider receiving portion fixedly connected to the board connecting portion and receiving the slider.

9. The connector according to claim 1, further comprising a guide mechanism for guiding the movement of the slider.

10. A connector for connecting a lamp tube having a lead wire, comprising a contact which comprises:

a contact portion for contact with the lead wire;

a board connecting portion for connection to a board;

a flexible link portion interposed between the board connecting portion and the contact portion; and a slider movable with respect to the contact, wherein the contact further comprising a pressing portion near the contact portion;

wherein the contact portion has floatability with respect to the board connecting portion through the link portion; and wherein the slider operates the pressing portion depending on movement of the slider to thereby displace the contact portion.

11. The connector according to claim 10, wherein the contact further comprises a slider receiving portion receiving the slider, wherein the slider is rotatably supported by the slider receiving portion.

12. The connector according to claim 10, wherein the contact further comprises a slider receiving portion receiving the slider, wherein the slider is slidably supported by the slider receiving portion.

13. The connector according to claim 10, further comprising a housing which accommodates the contact portion, the pressing portion, and the slider so as to be slidable in a predetermined direction with flexure of the link portion.

14. The connector according to claim 10, further comprising a housing which accommodates the contact portion, the pressing portion, and the slider, wherein the slider is rotatably supported by the housing.

15. The connector according to claim 12, further comprising a housing which accommodates the contact portion, the pressing portion, and the slider, wherein the slider is slidably supported by the housing.

16. The connector according to claim 10, wherein the contact further comprises:

a board connecting portion for connection to a board;

a flexible link portion interposed between the pressing portion and the board connecting portion; and a slider receiving portion fixedly connected to the board connecting portion and receiving the slider.

17. The connector according to claim 10, further comprising a guide mechanism for guiding the movement of the slider.

18. The connector according to claim 8, wherein the contact further comprises a slider receiving portion receiving the slider, wherein the slider is rotatably supported by the slider receiving portion.

19. The connector according to claim 8, wherein the contact further comprises a slider receiving portion receiving the slider, wherein the slider is slidably supported by the slider receiving portion.

20. The connector according to claim 8, further comprising a housing which accommodates the contact portion, the pressing portion, and the slider so as to be slidable in a predetermined direction with flexure of the link portion.

21. The connector according to claim 8, further comprising a housing which accommodates the contact portion, the pressing portion, and the slider, wherein the slider is rotatably supported by the housing.

22. The connector according to claim 8, further comprising a housing which accommodates the contact portion, the pressing portion, and the slider, wherein the slider is slidably supported by the housing.

23. The connector according to claim 21, wherein the contact further comprises:

a holding portion held by the housing;

a board connecting portion for connection to a board; and a flexible link portion interposed between the holding portion and the board connecting portion.

24. The connector according to claim 1, further comprising a guide mechanism for guiding the movement of the slider.

* * * * *